United States Patent Office 3,845,131
Patented Oct. 29, 1974

3,845,131
PROCESS FOR PREPARING ADAMANTANE
DERIVATIVES
Stephen Slomo Szinai, Gainesvillle, Fla., assignor to Eli
Lilly and Company, Indianapolis, Ind.
No Drawing. Filed Mar. 23, 1972, Ser. No. 237,542
Claims priority, application Great Britain, Apr. 3, 1971,
8,607/71
Int. Cl. C07c 45/14, 49/43
U.S. Cl. 260—586 R            2 Claims

ABSTRACT OF THE DISCLOSURE

An adamantyl halide is reacted with an isopropenyl acylate to yield adamantylacetone.

BACKGROUND OF THE INVENTION

In the co-pending application of one of us, Ser. No. 852,090, filed Aug. 2, 1969, now abandoned, there are described processes for preparing certain therapeutically useful adamantyl alkyl amines which comprise inter alia reacting an α-(1-adamantyl) acetone of the formula:

I

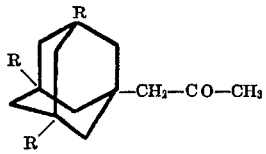

where each R is hydrogen or methyl, with ammonia or an appropriate amine.

As stated in the aforementioned application, the compounds of Formula I may be prepared from 1-bromoadamantane or 1-bromo-3,5,7-trimethyladamantane by hydrolysis to the corresponding 1-hydroxy compound, conversion of the latter to the corresponding 1-acetic acid and either reacting the acid with methyl lithium or converting the acid to its acid chloride followed by reaction with a dialkyl malonate. It can thus be seen that either a 3 or 4-stage reaction is necessary to convert 1-bromoadamantane or its 3,5,7-trimethyl derivative to the intermediate of Formula I. It is an object of the present invention to provide a method for carrying out the conversion in a single stage.

SUMMARY OF THE INVENTION

In fulfillment of the above and other objects, this invention provides a method for preparing a compound of Formula I

I

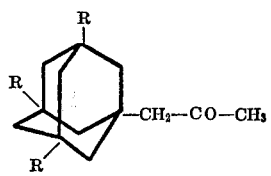

which method comprises reacting an adamantyl halide of the formula:

II

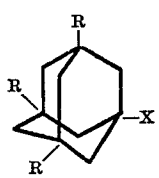

wherein X represents chlorine, bromine or iodine, preferably a bromine atom, and R is hydrogen or methyl, with an enol ester of the formula:

III

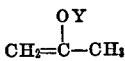

wherein Y represents phenyl

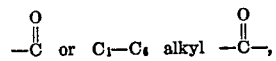

in the presence of a Friedel-Crafts catalyst and at a temperature of from −70° C. to +40° C. Illustrative acyl groups which Y represents include acetyl, propionyl, butyryl or benzoyl. Preferably, Y is an acetyl group.

In carrying out the reaction, the enol ester is desirably present in excess, for example up to 10 times the equimolar quantity. The preferred temperature range is from 0 to 25° C. As catalyst, it is preferred to use aluminum bromide but other Friedel-Crafts catalyst are also suitable, particularly aluminum chloride, boron trifluoride, phosphoric acid, sulphuric acid, ferric chloride and zinc chloride. The reaction is normally carried out in a conventional inert Friedel-Crafts solvent, the preferred solvent being carbon disulphide, although other solvents including nitrobenzene and the like are fully operative.

The following Example will further illustrate the method of the present invention:

EXAMPLE

To adamantyl bromide (10 g.) and aluminum bromide (6 g.) in carbon disulphide (30 ml.) were added dropwise a solution of isopropenyl acetate (20 g.) in carbon disulphide (20 ml.) during a period of 1 hour, with stirring, under a nitrogen atmosphere at room temperature. After a further 3 hours' stirring at room temperature, the reaction mixture was poured into a mixture of ice and 10% hydrochloric acid. The organic layer was washed repeatedly with water, twice with dilute sodium carbonate solution and again several times with water. The organic layer, after drying with sodium sulphate, was evaporated and the residue was distilled under vacuum to yield 1-(adamant-1-yl)propan-2-one, b.p. 70 to 72° C./0.2 mm. Hg. The product was found to be identical (G.L.C., I.R. and N.M.R. spectra, and refractive index) with a sample prepared by the above described known methods.

Similarly 1-(3,5,7-trimethyladamant-1-yl)propan-2-one, b.p. 88° C. to 90° C./0.7 mm. Hg, was prepared.

Adamantylacetone and the methyladamantylacetones can be reacted with ammonia or amines by standard procedures to yield adamantylethylamines. These amines according to German Pat. 2,064,904 have anti-inflammatory action. In addition they exhibit antidepressant activity in mammals and hence are valuable agents for the treatment of variously caused depressive states, such as, for example, depression associated with acute and chronic psychoses. The compounds of the present invention are also useful for the relief of Parkinsonism and motion sickness, and for appetite suppression. The usefulness of the present compounds has been demonstrated by art recognized test procedures, in which reserpine hypothermia, tetrabenazine sedation, and tremorine-induced symptoms have been created by medication with reserpine, tetrabenazine, and tremorine, respectively.

I claim:
1. A process for the preparation of adamantylacetones of the formula

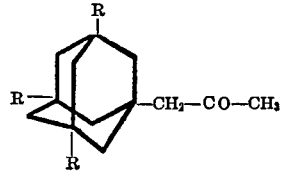

wherein R is hydrogen or methyl, which comprises reacting an adamantyl halide of the formula

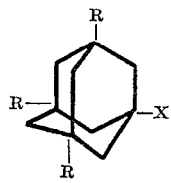

wherein X is chlorine, bromine or iodine with an enol ester of the formula

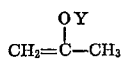

wherein Y is phenyl

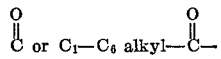

in the presence of a Friedel-Crafts catalyst and an inert solvent and at a temperature in the range $-70°$ C. to $+40°$ C.

2. The process of claim 1 wherein X is bromine and Y is acetyl.

References Cited

Gagosian et al.: J. Amer. Chem. Soc., vol. 92, pp. 4752–4 (1970).

Szinai et al.: "Chem. Ab.," vol. 75, p. 7626p (1971).

BERNARD HELFIN, Primary Examiner

N. MORGENSTERN, Assistant Examiner

U.S. Cl. X.R.

260—514 G, 544 L, 563 P, 617 R, 648 R; 424—325